Jan. 13, 1948.   G. J. MUCHER   2,434,248
COUPLING FOR POTENTIOMETERS
Filed May 19, 1945
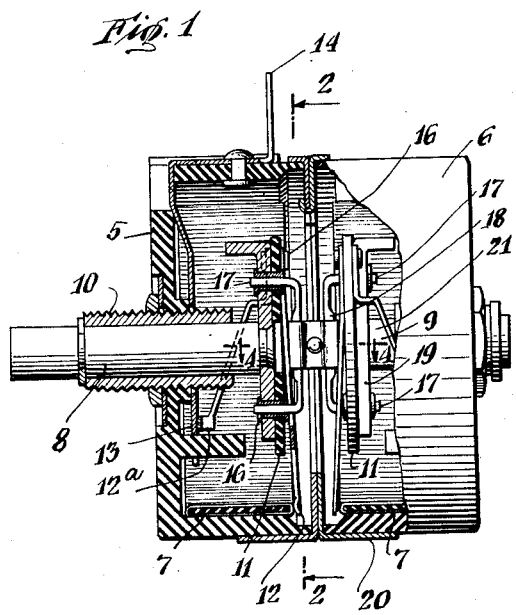
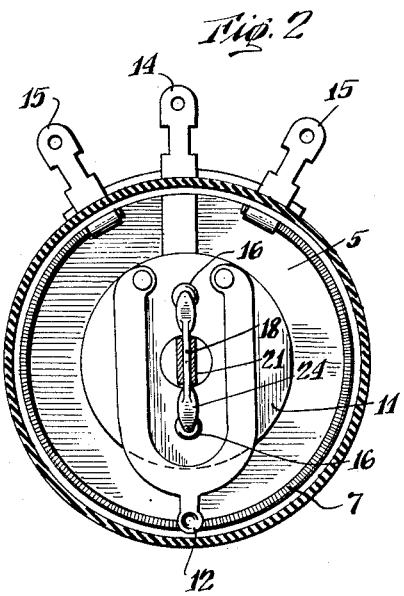
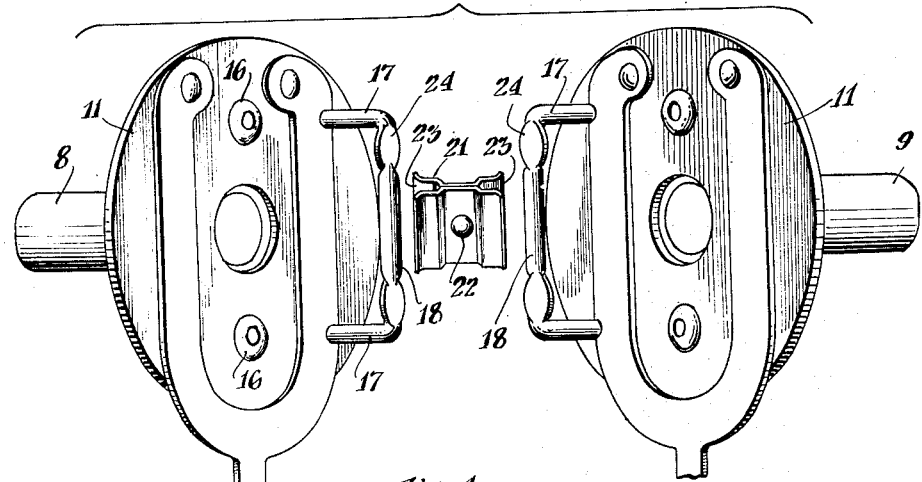
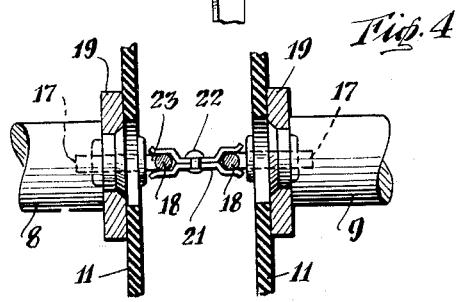
INVENTOR.
George J. Mucher
BY
ATTORNEYS Patented Jan. 13, 1948

2,434,248

UNITED STATES PATENT OFFICE 2,434,248

COUPLING FOR POTENTIOMETERS

George J. Mucher, Brooklyn, N. Y., assignor to Clarostat Mfg. Co., Inc., Brooklyn, N. Y., a corporation of New York Application May 19, 1945, Serial No. 594,776

1 Claim. (Cl. 173—324)

This invention relates to a structurally and functionally improved coupling and in its more specific aspects aims to provide a unit of this character which will be of particular utility when combined with or incorporated in an electrical control unit.

A convenient form of such unit may be a potentiometer, rheostat or similar assembly. In electrical instruments it frequently becomes desirable to provide an efficient form of coupling and by means of which the movements of two elements may be synchronized so that, as one of the same is shifted or adjusted, the other of the same is moved precisely to a corresponding degree. By means of the present invention, such a coupling is furnished and which coupling will have the advantage that it will be capable of ready application and detachment but will normally hold two elements of an assembly of apparatus against movement with respect to each other.

Accordingly, structures contemplating the teachings of the present invention may be incorporated in the two different elements so that, subsequently, an assembly may be readily created and which assembly may be shifted or adjusted as a unit.

A further object is that of providing a coupling which will be of extremely simple construction and capable of quantity manufacture. Additionally, the structure will be sufficiently rugged to withstand stresses far beyond those normally occurring under ordinary conditions of use.

Moreover, a structure is furnished and by means of which a relatively unskilled operator may properly couple the parts of an assembly or effect a detachment of such parts with virtually no expenditure of effort or time.

With these and other objects in mind, reference is had to the attached sheet of drawings illustrating one practical embodiment of the invention and in which:

Fig. 1 is a partly sectional side view of a "dual" type of assembly;

Fig. 2 is a transverse sectional view taken along the lines 2—2 and in the direction of the arrows as indicated in Fig. 1;

Fig. 3 is an exploded view showing certain elements of the assembly and the coupling; and Fig. 4 is an enlarged sectional view taken along the lines 4—4 and in the direction of the arrows as indicated in Fig. 1.

In these several views, the invention has been shown as forming a part of a dual assembly of electrical units. The latter have been illustrated as being in the nature of potentiometers. As will be apparent, the present coupling might be employed to connect—not alone instruments embodying constructions different from those illustrated—but also other types of instruments. Moreover, the coupling might, in certain instances, be employed to advantage in assemblies other than the dual type. Accordingly, and except where otherwise indicated in the appended claims, the present drawings and following description are to be taken in an illustrative rather than a limiting sense.

Thus, as shown especially in Figs. 1 and 2, the instruments or units may include casings 5 and 6. Disposed within the latter may be coils 7, the windings of which are electrically separated from each other and which windings are fixed with respect to the casings 5 and 6. Rotatable shafts 8 and 9 are also mounted within the casings; the shaft 8 preferably extending well beyond its casing 5 and through a bushing 10.

Each of these shafts may mount a rotor in the form of a di-electric disc 11 carrying a contact finger or arm 12 which yieldingly engages the peripheral portions of its adjacent coil 7. Each of these arms is connected electrically to a finger or arm portion 12a which yieldingly bears against the plate 13. The plate 13 may be coupled to a terminal 14 extending beyond the casing with which it is associated. Likewise extending beyond this casing are terminals 15 which may be coupled, one to each of the ends of coil 7.

The foregoing structure may, as previously brought out, be varied in numerous respects. However, with such a general construction, it is, of course, apparent that, considering the operation of merely one of the units or instruments, a rotation of its shaft will cause the arm 12 to traverse the convolutions of the coil. With terminals 14 and 15 suitably connected, it is moreover apparent that such traversal will cause an adjustment in the values of an electrical circuit or circuits connected to the parts. If, now, it is desired to have the shaft 8 for example cause a rotation of the shaft 9 in absolute synchronism therewith, then it becomes necessary to connect these shafts in a manner such that no lag or backlash of one with respect to the other will occur.

The structure herein contemplated, in addition to preventing play between the movable parts of the electrical units, furnishes, in effect, a universal coupling. In other words, the connection afforded is such that perfect alignment of the parts does not have to be achieved; the coupling allowing for any such disalignment. In its broader aspects, the structure might be defined as embodying the foregoing functional characteristics and being connected to any proper extensions or recessed portions forming parts of the movable elements of the units.

The preferred form of the invention, however, contemplates brackets mounted by the rotors; such mounting being conveniently achieved by employing eyelets or rivets which may serve the further purpose of connecting other parts of the rotor assembly. Thus, as in Figs. 3 and 4, the discs or members 11 may mount eyelets 16 which conveniently receive the ends of brackets 17. The latter conveniently have annular central portions 18 which extend perpendicular to the axes of shafts 8 and 9. Also, as shown in enlarged form in Fig. 4, the eyelets may, in effect, provide rivet portions serving to secure metallic members 19 to the rotors. These members may be affixed to their respective shafts 8 and 9.

Where it is desired to provide a dual installation, the casings 5 and 6 are arranged in face-to-face relationship as especially shown in Fig. 1. The adjacent casing faces will be substantially open and these casings may be secured against movement in any desired manner by, for example, employing a ring-shaped assembly 20. Under these circumstances the brackets 17 will be disposed adjacent each other. Also, they may serve as position indicators for the rotors in that the brackets will, at all times, have a predetermined relationship to the several parts established by the rotor. Therefore, if the casings 5 and 6 are likewise connected to provide such a relationship, assurance may be had that with one rotor in a predetermined position with respect to its casing, a substantial alignment of the second rotor with reference to the first one will establish a similar and, in fact, identical electrical relationship of the parts with which it is associated.

To thus couple the rotors so that this relationship will be maintained irrespective of the position to which the shaft or similar operating unit 8 is adjusted, a bridging piece or clip member is employed. A desirable form has been shown in Figs. 3 and 4. It conveniently includes a pair of strips formed of bronze or other material, which strips have been indicated by the reference numeral 21. They are secured against movement with respect to each other by a rivet 22 or any other desirable form of securing element. The strips preferably define, adjacent their opposite ends, relatively long channel portions 23 in the form of clips capable of snugly embracing and engaging the annular portions 18 of the brackets. The outer edges of these strips are flared and serve as guides to receive and divert the annular portions 18 to proper positions.

It follows that an operator, confronted with the problem of coupling the rotors of the two instruments or units, will simply clip one edge of the bridging strip or coupling to the portion 18 of one of the brackets 17. Thereupon, he will assure himself that the rotor of the second unit is substantially in registry with the rotor of the first instrument. This will be determined by the bracket mounted by that second rotor being substantially aligned with the bracket of the first, as well as the clip supported by that bracket.

If, now, the casings 5 and 6 are moved into face-to-face contact, the clip or channel portion opposed to the one already mounted on the bracket will receive the annular portion 18 of the second bracket. Any slight disalignment of the parts will be corrected during such reception, incident to the flaring construction or guiding lips of the clip. When the parts are in position, the clip will provide a universal coupling such that movements of the parts will be perfectly synchronized. Due to the width of the bridging element, a proper stability of the assembly is assured. Moreover, by virtue of the relatively enlarged portions 24 of the brackets 17, a proper positioning of the bridging element will be assured; the same being confined to mounting on the annular portions 18.

As is apparent, a ready separation of the parts may be assured by simply moving the casing portions in opposed and outward directions after the mounting and retaining structure 20 has been rendered inoperative. Ordinarily, however, such separation will not occur during the life of the instrument. When in applied position, the coupling may also serve to dissipate any "strays" in that current may be grounded from the shafts 8 and 9. This will occur due to the fact that the members 19, as shown, may conveniently be connected to both the shafts 8 and 9, as well as the eyelets 16. The latter being coupled to the brackets which are in turn connected by the bridging element, it follows that it is perfectly feasible to obtain the results specified should they be desired.

As afore brought out, coupling structures designed in accordance with the present teachings will prevent any backlash or lag occurring between units which are to have their movements synchronized. This is especially necessary in setups of apparatus involving critical circuits and where—if two units were out of phase or moved with respect to each other even to a minute degree—desired results would not be achieved. As will be apparent by means of the present structure, completely synchronized movements of the parts will be secured. This is true whether the dual unit comprises a pair of instruments—as illustrated—or if the coupling is duplicated to actually synchronize a series of units involving any desired number. In the latter connection, it will be appreciated that by suitably mounting the brackets or movable parts and coupling opposed brackets by bridging elements the association of any desired number of units may be readily secured.

Thus, among others, the several objects of the invention are achieved. Obviously, numerous changes and rearrangements of the parts might be resorted to without departing from the spirit of the invention as defined by the claim.

I claim:

A coupling for electrical instruments having rotary contact members, said coupling comprising brackets secured to each of said contact members and a bridging element for relative connection of said brackets, the brackets including spaced enlargements, and the bridging element including jaw forming portions adapted to engage the said brackets at the area between said enlargements.

GEORGE J. MUCHER.

REFERENCES CITED

The following references are of record in the file of this patent:

UNITED STATES PATENTS

| Number | Name | Date |
|---|---|---|
| 1,833,042 | Schellenger | Nov. 24, 1931 |
| 1,695,875 | Aiken | Dec. 18, 1928 |
| 2,120,651 | Schellenger | June 14, 1938 |
| 1,466,057 | Mathews | Aug. 28, 1923 |